United States Patent
Van Rooijen

(10) Patent No.: US 10,356,987 B2
(45) Date of Patent: Jul. 23, 2019

(54) INSERT AND APPARATUS FOR TRANSPLANTING PLANTS

(71) Applicant: Goldfields Collections Pty Ltd, Clayton South, Victoria (AU)

(72) Inventor: Nicolaas Van Rooijen, Berwick (AU)

(73) Assignee: Goldfields Collections Pty Ltd, Clayton South (AU)

(*) Notice: Subject to any disclaimer, the term of this patent is extended or adjusted under 35 U.S.C. 154(b) by 0 days.

(21) Appl. No.: 15/899,260

(22) Filed: Feb. 19, 2018

(65) Prior Publication Data

US 2018/0184597 A1   Jul. 5, 2018

Related U.S. Application Data

(63) Continuation of application No. 14/776,549, filed as application No. PCT/AU2014/000253 on Mar. 13, 2014, now Pat. No. 9,901,037.

(30) Foreign Application Priority Data

Mar. 13, 2014   (AU) ................................ 2013900861

(51) Int. Cl.
| | | |
|---|---|---|
| *A01G 9/02* | (2018.01) | |
| *A01G 9/029* | (2018.01) | |
| *A01G 22/00* | (2018.01) | |
| *G06Q 50/02* | (2012.01) | |

(52) U.S. Cl.
CPC .............. *A01G 9/028* (2013.01); *A01G 9/029* (2018.02); *A01G 9/0293* (2018.02); *A01G 9/0295* (2018.02); *A01G 9/0297* (2018.02); *A01G 22/00* (2018.02); *G06Q 50/02* (2013.01)

(58) Field of Classification Search
CPC ........ A01G 9/028; A01G 9/10; A01G 9/1026; A01G 9/104; A01G 9/108
See application file for complete search history.

(56) References Cited

U.S. PATENT DOCUMENTS

| | | | |
|---|---|---|---|
| 3,606,004 A | 9/1971 | Fruehwirth | |
| 4,224,765 A | 9/1980 | Song | |
| 4,586,288 A * | 5/1986 | Walton | ................... A01H 4/001 47/73 |
| 5,203,109 A | 4/1993 | Simon et al. | |
| 5,215,550 A | 6/1993 | Tesch, Jr. et al. | |
| 5,548,924 A | 8/1996 | Mekler | |
| 2010/0180500 A1 | 7/2010 | Visser et al. | |
| 2010/0191677 A1 | 7/2010 | Honig | |
| 2012/0137581 A1* | 6/2012 | Teasdale | ................ A01G 31/02 47/66.6 |
| 2012/0272570 A1 | 11/2012 | Rinehart | |
| 2016/0270303 A1* | 9/2016 | Cooley | ................ A01G 9/0295 |

FOREIGN PATENT DOCUMENTS

| | | |
|---|---|---|
| GB | 2310352 A | 8/1997 |
| JP | 2002-262681 A | 9/2002 |
| WO | 9319581 A1 | 10/1993 |
| WO | 2006106243 A1 | 10/2006 |
| WO | 2011014933 A1 | 2/2011 |

OTHER PUBLICATIONS

WIPO, International Search Report for PCT/AU2014/000253, dated May 30, 2014, Australian Patent Office, 7 pages.
WIPO, International Preliminary Report on Patentability for PCT/AU2014/000253, dated Aug. 14, 2015, Australian Patent Office, 12 pages.
Supplementary Partial European Search Report and the European Search Opinion issued for EP 14 76 5421, dated Aug. 2, 2016, 12 pages.
Examination report No. 1 for Australian patent application No. 2018100958, dated Sep. 6, 2018, 8 pages.

* cited by examiner

*Primary Examiner* — Kristen C Hayes
(74) *Attorney, Agent, or Firm* — Quarles & Brady LLP

(57) ABSTRACT

An insert for growing plants, including a plurality of receptacles, adapted for insertion into a container, wherein each of the receptacles is arranged for receiving a separate plant with a portion of gel for feeding the plant. The receptacles may be arranged to allow communication between the portions of gel in the receptacles to allow the plants to share a common feed reservoir of the gel.

5 Claims, 13 Drawing Sheets

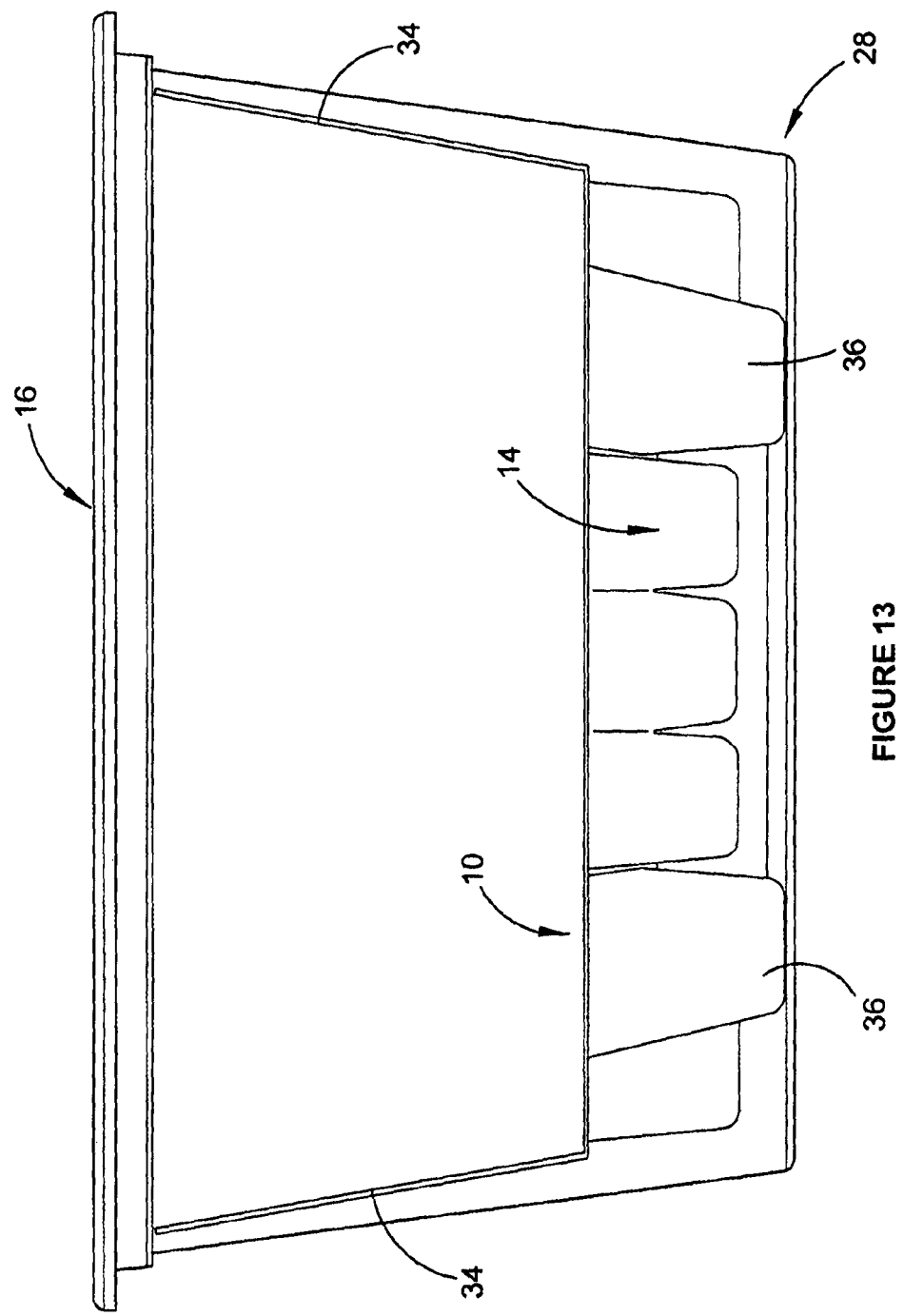

INSERT AND APPARATUS FOR
TRANSPLANTING PLANTS

CROSS-REFERENCE TO RELATED
APPLICATIONS

This application claims priority to and is a continuation of U.S. patent application Ser. No. 14/776,549, filed on Sep. 14, 2015, which issued as U.S. Pat. No. 9,901,037 and is a U.S. National Stage application, filed pursuant to 35 U.S.C. § 371, of international application no. PCT/AU2014/000253, filed Mar. 13, 2014, which claims priority to Australian patent application no. 2013900861, filed Mar. 13, 2013, the contents of each of the foregoing being incorporated herein by reference.

FIELD OF THE INVENTION

The invention relates to an insert for growing young plants in gel, and to an apparatus for transplanting young plants. More particularly, but not exclusively, the invention relates to an insert for facilitating automated transplanting of plants from the insert into soil.

BACKGROUND OF THE INVENTION

It is known to provide very large numbers of plants for certain types of jobs such as, for example, planting alongside long stretches of roads and freeways. For such jobs, the plants may be provided in a number of ways such as by way of cuttings, by seeds, by tissue culture, or by division/splitting. However, the applicant has identified that the use of cuttings is not possible for many plants and may be expensive; the use of seeds may provide too great variation in plant type/appearance; division/splitting may require a significant amount of labour, and tissue culture may be prohibitively expensive. However, the applicant has identified that while tissue culture may be an expensive method for growing young embryonic plants, it is beneficial in that it guarantees the most uniformity in the plants grown which is advantageous in large jobs where uniformity of appearance is desired, such as in planting alongside long stretches of freeway roads. Also, the applicant has identified that the growing of plants by using tissue culture enables the plants to be grown in a sterile environment such that the plants can be taken between countries without being quarantine being required, whereas growing plants in soil may be prohibited or result in quarantine for an extended period.

The ability to transport plants between countries when sterile enables the plants to be originated in a different country from the end market, for example in a laboratory where labour is cheaper. However the applicant has identified that there exists a problem in that the sterile plants need to be transplanted in the destination country, that with existing methods this transplanting needs to be done manually, and that this is expensive in view of the manual labour required in the destination country which is typically a country of high labour cost.

Examples of the invention seek to provide an improved apparatus and method for growing and transplanting young plants which overcomes or at least alleviates disadvantages associated with existing apparatus and methods.

SUMMARY OF THE INVENTION

In accordance with one aspect of the present invention, there is provided an insert for growing plants, including a plurality of receptacles, adapted for insertion into a container, wherein each of the receptacles is arranged for receiving a separate plant with a portion of gel for feeding the plant.

Preferably, the receptacles allow communication between the portions of gel in the receptacles to allow the plants to share a common feed reservoir of the gel.

Preferably, all of the receptacles are continuous with the common feed reservoir.

It is preferred that each of the receptacles has a respective aperture such that the portions of gel are continuous with a common volume of gel via each respective aperture. More preferably, the aperture is located in a base of the respective receptacle.

In one form, there is provided the insert, when in situ in the container, wherein the container contains the gel and the insert is immersed in the gel such that the gel rises to a common level in each of the receptacles.

Preferably, the insert has one or more feet to support the insert above a floor of the container to provide space beneath the receptacles for the common feed reservoir. More preferably, said one or more feet support the receptacles at least 3 mm above the floor of the container.

In a preferred form, walls of each receptacle are smooth to allow upward removal of the respective gel portion as a plug together with the respective plant for transplanting.

Preferably, the receptacles are arranged in a grid.

Preferably, the receptacles are arranged in rows and columns.

In a preferred form, each of the receptacles tapers inwardly toward a lower end of the receptacle.

Preferably, a majority of the receptacles are sized with a top of each receptacle being square with 12 mm sides, and a bottom being square with 9 mm sides.

Preferably, the insert is circular with a diameter of approximately 95 mm.

In a preferred form, the insert has 37 receptacles.

It is preferred that the receptacles are arranged in rows from one side to an opposite side with the following number of receptacles in consecutive rows: 3, 5, 7, 7, 7, 5 and 3.

Preferably, the insert is formed of plastic material.

Preferably, the container is circular.

In a preferred form, the container has a lid for maintaining sterility within the container.

In one form, the gel is agar.

In accordance with another aspect of the present invention, there is provided an insert for growing plants, including a plurality of receptacles, adapted for insertion into a container, wherein each of the receptacles is arranged for receiving a separate plant, the insert including at least one arm adapted to bear against the container to maintain the insert in position relative to the container.

In accordance with another aspect of the present invention, there is provided a container for growing plants including a plurality of receptacles, wherein each of the receptacles is arranged for receiving a separate plant with gel for providing nutrition to the plant, and wherein the receptacles allow communication between the portions of gel in the receptacles to allow the plants to share a common feed reservoir of the gel.

In accordance with another aspect of the present invention, there is provided an apparatus for transplanting plants from a container having an insert as defined above, wherein the apparatus is adapted to remove each of the plants by gripping the plant at the respective portion of gel.

In accordance with yet another aspect of the present invention, there is provided an apparatus for transplanting plants from a container having an insert as defined above, wherein the apparatus operates automatically by being aware of the number of receptacles in the container, and the spacing between the receptacles.

In accordance with yet another aspect of the present invention, there is provided a method of supplying plants including the steps of growing the plants in a first country in a sterile environment, the plants being planted in agar for feeding the plants; storing the plants in the sterile environment in a sealed container, the plants being arranged in a predetermined ordered arrangement in the container; transporting the container to a second country in the sealed container; opening the container in the second country; and removing the plants from the container using a machine which automatically locates and removes each of the plants on the basis of the predetermined ordered arrangement.

BRIEF DESCRIPTION OF THE DRAWINGS

The invention is described, by way of non-limiting example only, with reference to the accompanying drawings, in which:

FIG. 13 shows a side view of a container fitted with the insert of FIG. 9.

DETAILED DESCRIPTION

With reference to FIGS. 1 to 8, there is shown an insert 10 for growing embryonic plants, in accordance with an example of the present invention. Advantageously, the insert 10 arranges the embryonic plants in such a way that a transplanting apparatus, such as an automated transplanting machine, is able to know where there plants are so that gripping fingers (or the like) of the transplanting apparatus are able to automatically transplant the plants from the insert 10, thereby dramatically cutting down on the amount of labour and the associated costs in producing a large number of mature plants. As the insert 10 ensures that the plants are planted in an orderly array, the transplanting apparatus is able to be programmed to remove the plants with attached agar plugs from the insert 10 for transplanting into soil.

The applicant has also identified that with completely independent cells/receptacles in the insert, the plants would not be able to share the agar food source. However, in preferred examples of the present invention, the insert 10 may provide for continuity of the agar volume in the different cells/receptacles so that the plants are able to share food, thereby reducing the mortality rate as some plants may grow more quickly than others and run out of food in an isolated cell.

Figure 1:
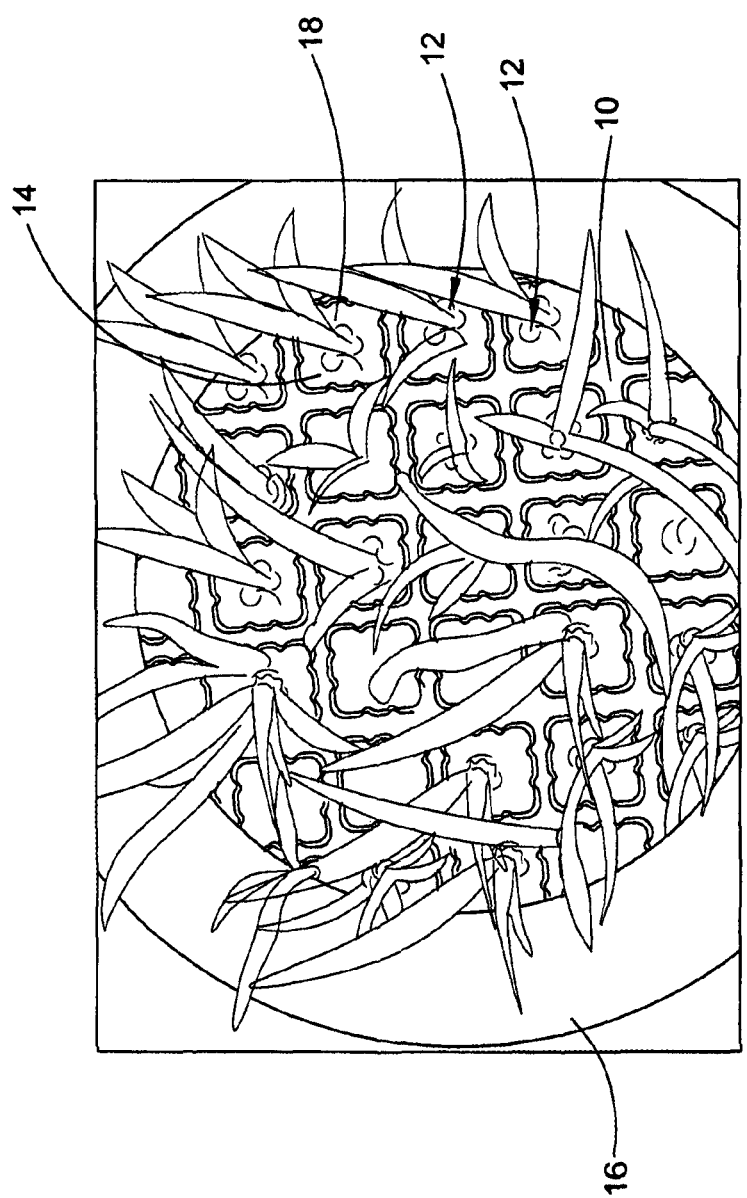
FIG. 1 shows a top view of an insert in a container, with plants in receptacles of the insert, in accordance with an example of the present invention.
Figure 2:
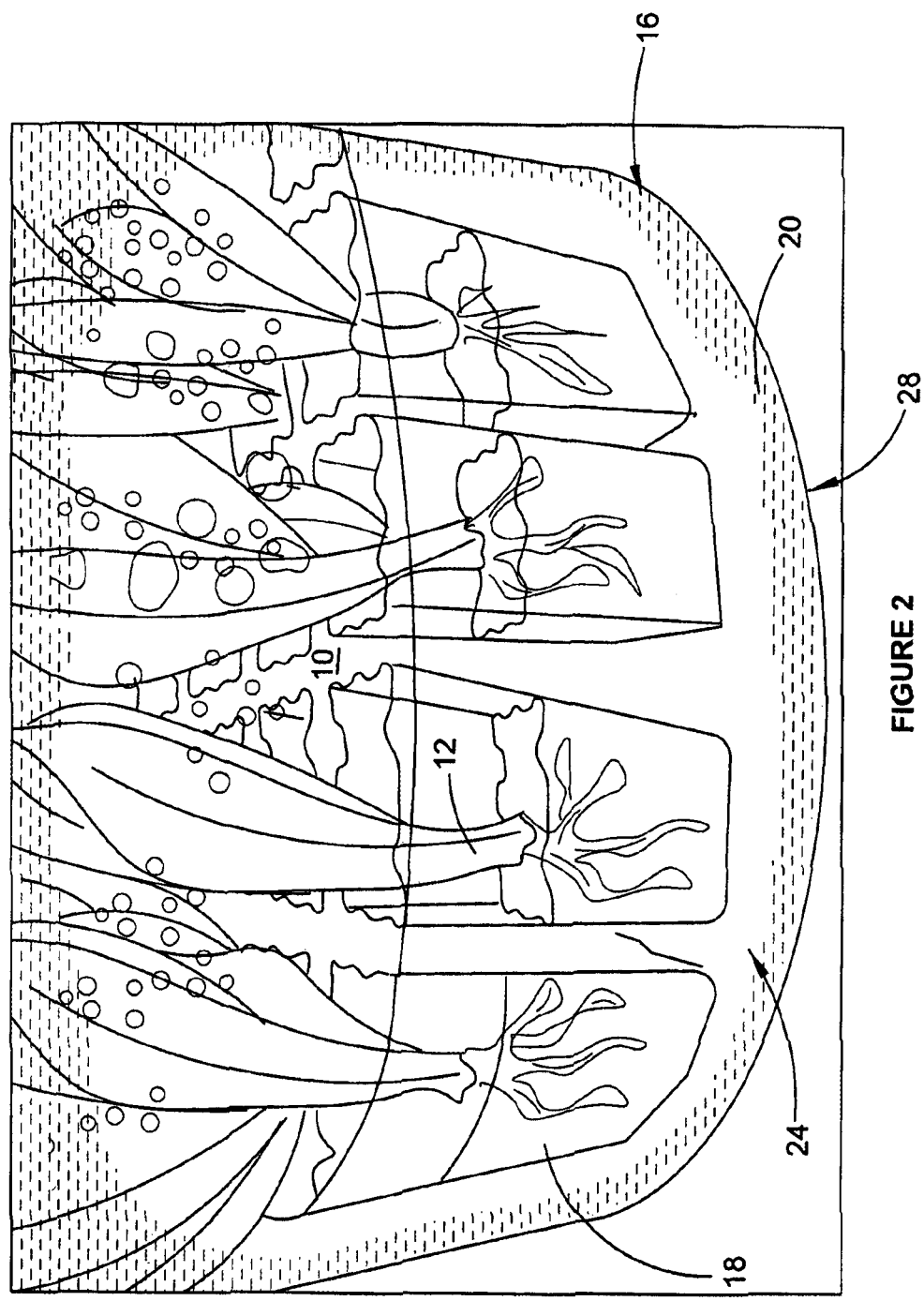
FIG. 2 shows a detailed side view of the insert of FIG. 1.
Figure 4:
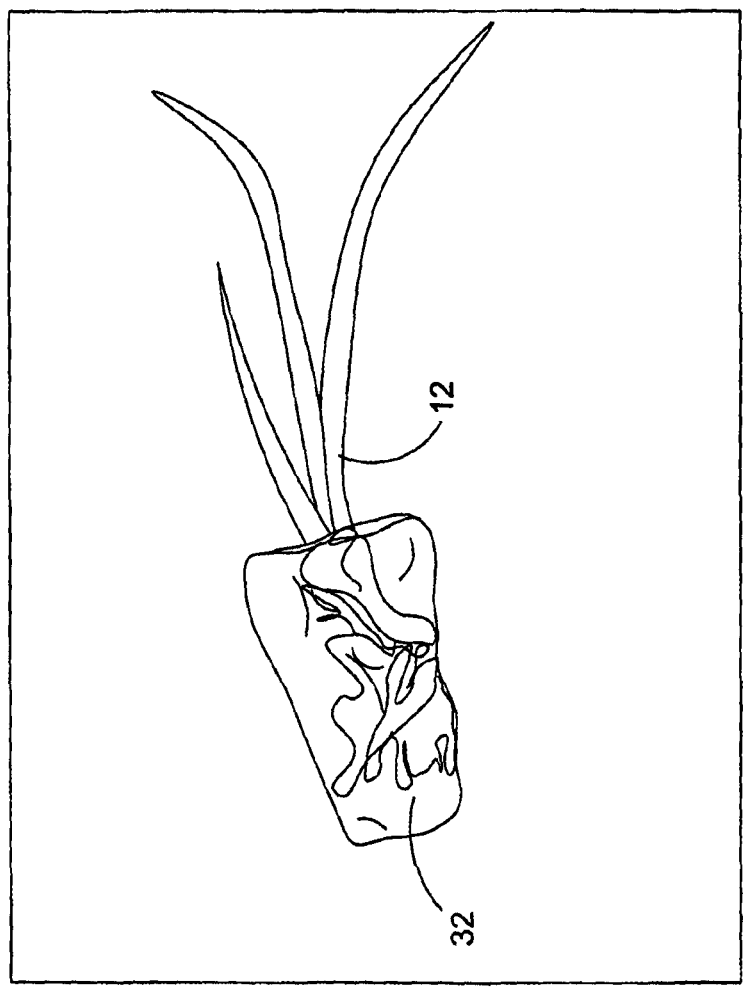
FIG. 4 shows detail of a plant in an agar plug which has been removed from the insert shown in FIG. 1.
Figure 5:
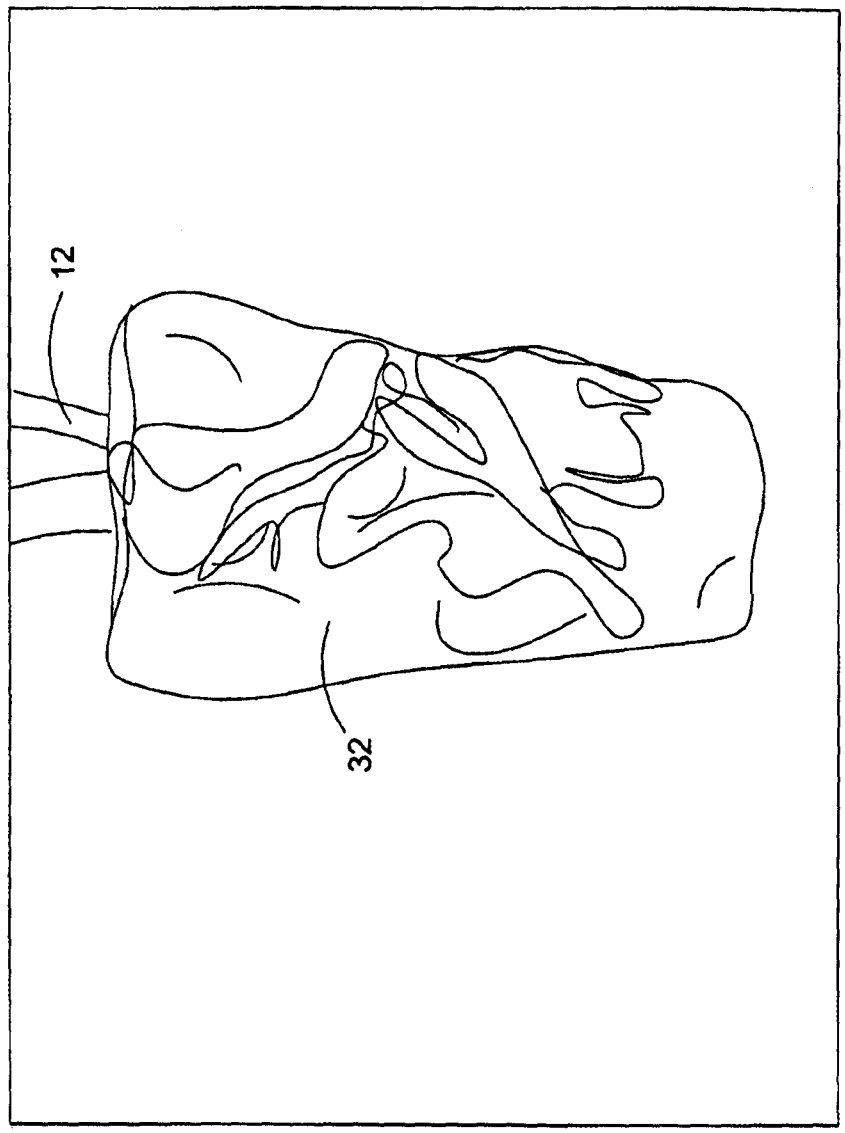
FIG. 5 shows a detailed side view of the agar plug.
Figure 6:
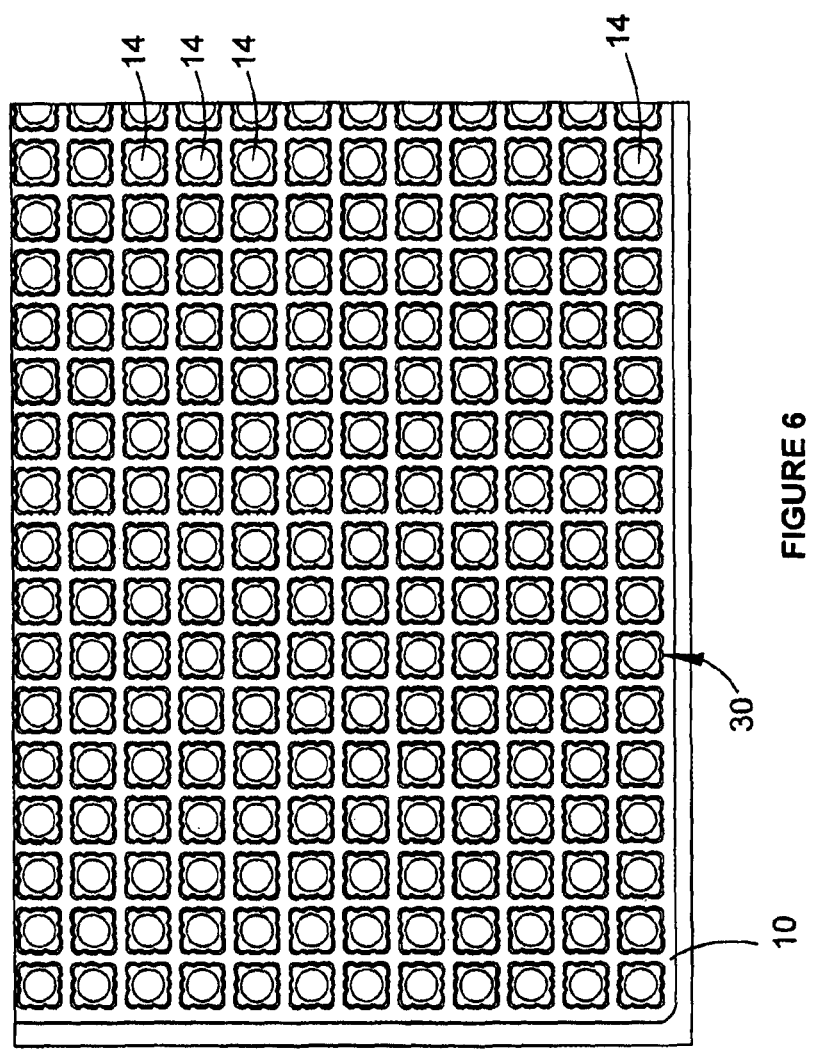
FIG. 6 shows a top view of an insert in accordance with another example of the present invention.
Figure 7:
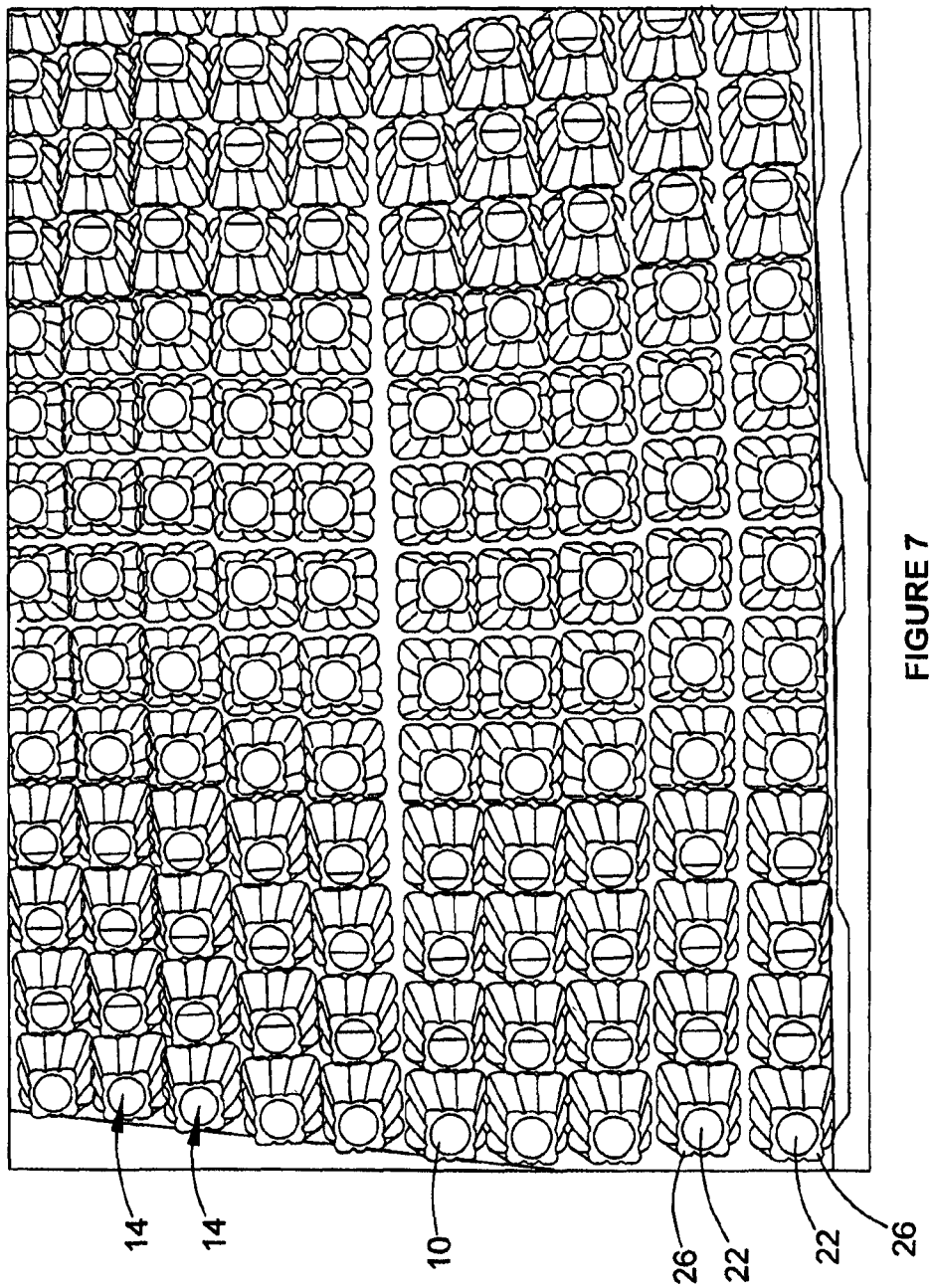
FIG. 7 shows a bottom view of the insert of FIG. 6.
Figure 8:
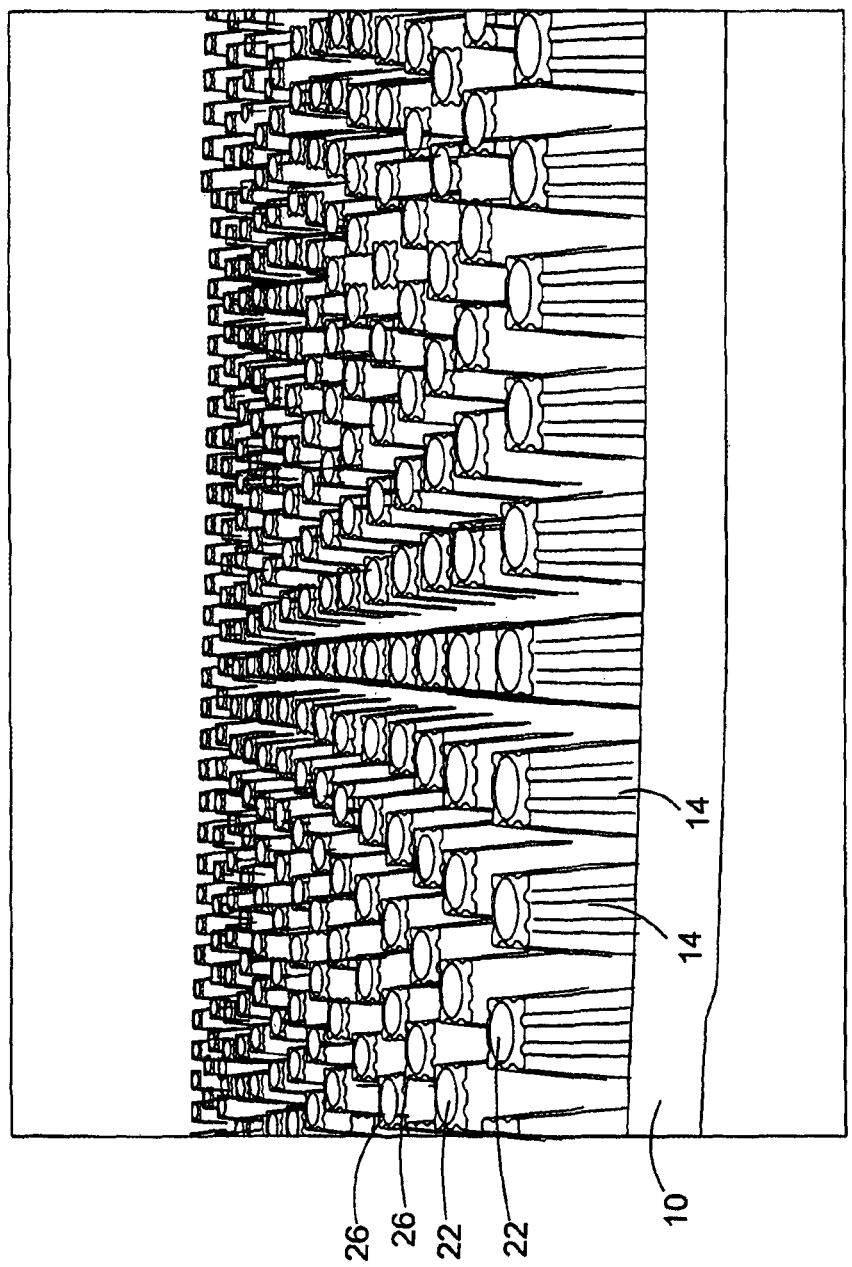
FIG. 8 shows a bottom perspective view of the insert of FIG. 6.

More specifically, with reference to FIGS. 1 to 5, there is shown an insert 10 for growing plants 12, including a plurality of receptacles 14. The insert 10 is adapted for insertion into a container 16, and each of the receptacles 14 is arranged for receiving a separate one of the plants 12 with a portion of gel 18 for feeding the plant 12. The receptacles 14 may allow communication between the portions of gel 18 in the receptacles 14 to allow the plants 12 to share a common feed reservoir 20 of the gel. The receptacles 14 may be arranged such that all of the receptacles 14 are continuous with the common feed reservoir 20. For example, although the receptacles 14 are shown as being separate in the top view of FIG. 1, FIG. 2 shows several receptacles 14 through a side of the container 16, wherein the receptacles 14 share the common feed reservoir 20. The common feed reservoir 20 may be shared by all of the receptacles 14 by allowing the receptacles 14 to be in fluid communication with all of the other receptacles 14, by providing an aperture in each of the receptacles 14. Accordingly, each of the receptacles 14 may have a respective aperture 22 such that the portions of gel 18 are continuous with a common volume of gel 24 via each respective aperture 22. The aperture 22 may be located in a base 26 of the respective receptacle 14, as shown in the embodiment of FIGS. 6 to 8. The insert 10 shown in FIGS. 1 to 5 may be formed in a similar configuration to the insert of FIGS. 6 to 8, and may comprise a circular section cut from the large rectangular insert of FIGS. 6 to 8.

Figure 3:
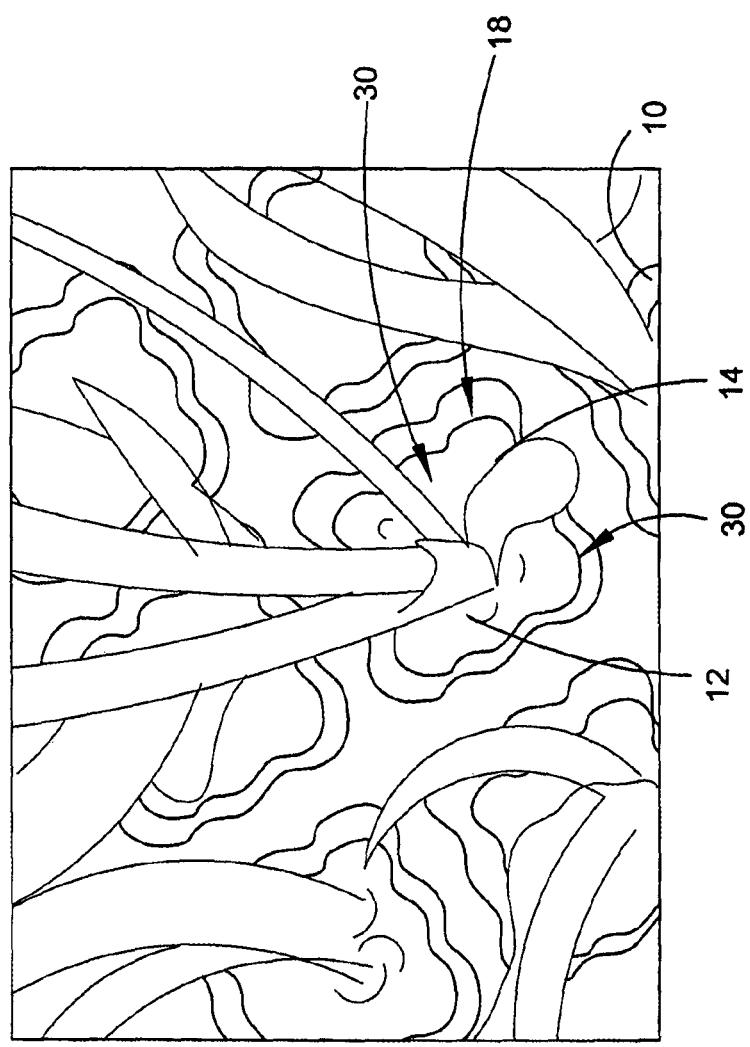
FIG. 3 shows a detailed top perspective view of a receptacle of the insert of FIG. 1.

In this way, by virtue of the apertures 22, when the insert 10 is in situ in the container 16, the container contains the gel and the insert 10 is immersed in the gel such that the gel rises to a common level in each of the receptacles 14. As shown in FIGS. 1 to 3, the amount of gel may be controlled such that this level of the gel is at or just below an upper surface of the insert 10.

The insert 10 may have one or more feet (not shown) to support the insert 10 above a floor 28 of the container 16 to provide space beneath the receptacles 14 for the common feed reservoir 20. The feet may be configured to support the receptacles 14 at least 3 mm above the floor 28 of the container 16 so as to allow the common feed reservoir 20 to be of a sufficiently large size to provide enough food for the entire number of plants in the container 16.

With reference to FIG. 3, the walls 30 of each receptacle 14 are smooth to allow upward removal of the respective gel portion 18 as a plug together with the respective plant 12 for transplanting. The removed gel plug 32 intact with the respective plant 12 is shown removed from the insert 10 in FIGS. 4 and 5.

The receptacles 14 may be arranged in a grid of rows and columns so as to facilitate automated removal of the plants 12. The plants 12 with the attached plugs 22 may be removed from the insert 10 simultaneously, one row at a time, or individually, however an important common aspect is that the insert 10 enables a machine to know where to locate each of the plants 12 in the container 16, which would not be possible without the insert 10, as the plants 12, without the structure provided by the insert 10, may be randomly distributed throughout the container 16.

Each of the receptacles 14 may be tapered inwardly (see FIG. 8) toward a lower end 26 of the receptacle 14 so as to facilitate removal of the plugs 32 from the receptacles 14. As can be seen in FIG. 4 and FIG. 5, the plugs 32 are also tapered inwardly toward the bottom of the plugs 32.

The receptacles 14 may be sized with a top of each receptacle being square with 12 mm sides, and with a bottom being square with 9 mm sides. The insert 10 may be circular with a diameter of approximately 95 mm, as shown in FIGS. 1 to 3. This size enables the insert 10 to be placed inside a container 16 of the type typically used for take away food. The insert 10 may have 37 receptacles 14 in total, being arranged in rows from one side to an opposite side with the following number of receptacles 14 in consecutive rows: 3, 5, 7, 7, 5 and 3.

The insert 10 may be formed of plastic material, and may be formed by plastic injection moulding. The container 16 may be circular, as per a typical take away food container, and may have a lid for maintaining sterility within the container 16. Because the food source is provided in the form of the gel 18, the container 16 may be closed from the time of planting the plants 12 in the gel 18 until the container 16 is exported to the destination country at which time the lid can be removed as sterility is no longer required once the container 16 has been brought into the destination country in its sterile form so as to avoid quarantine.

The gel 18 may be agar, supplemented with a nutrient and vitamin mixture that allows for seedling germination under sterile conditions. The seeds must be sterilised as well.

In another form, there may be provided a suitable container which has an integrally formed equivalent of the insert 10. In this way, the receptacles 14 may be integrally formed within the container, each of the receptacles being arranged for receiving a separate plant with gel for providing nutrition to the plant, the receptacles allowing communication between the portions of gel in the receptacles to allow the plants to share a common feed reservoir of the gel.

In yet another form of the invention, there is provided an apparatus for transplanting plants from a container having integrally formed receptacles, or an insert as shown in FIGS. 1 to 3 or 6 to 8. The apparatus may be adapted to remove each of the plants by gripping the plant by the respective plug so as to maintain the plug intact for transplanting. The apparatus may be in the form of a machine which operates automatically by being aware (either by programming or detection) of the number of receptacles in the container, and the spacing between the receptacles.

With reference to FIGS. 9 to 13, there is shown an insert 10 in accordance with another example of the present invention. The insert 10 depicted in FIGS. 9 to 13 is generally similar to the insert of FIG. 1 and like features are labelled with like reference numerals. The main difference lies in that the insert of FIGS. 9 to 13 includes a feature specifically provided to maintain proper location of the insert 10 in the container 16. More specifically, the insert 10 includes at least one arm 34 adapted to bear against the container 16 to maintain the insert 10 in position relative to the container 16. In the example shown in FIGS. 9 to 13, the arm 34 is adapted to abut a lid of the container 16 to maintain the insert 10 in position relative to the lid. This may be achieved by arranging the arm 34 so that it has a length whereby a distal tip of the arm 34 terminates level with a lower surface of the lid when the insert 10 is in situ resting on the floor 28 of the container 16, as shown in FIG. 13.

Figure 9:
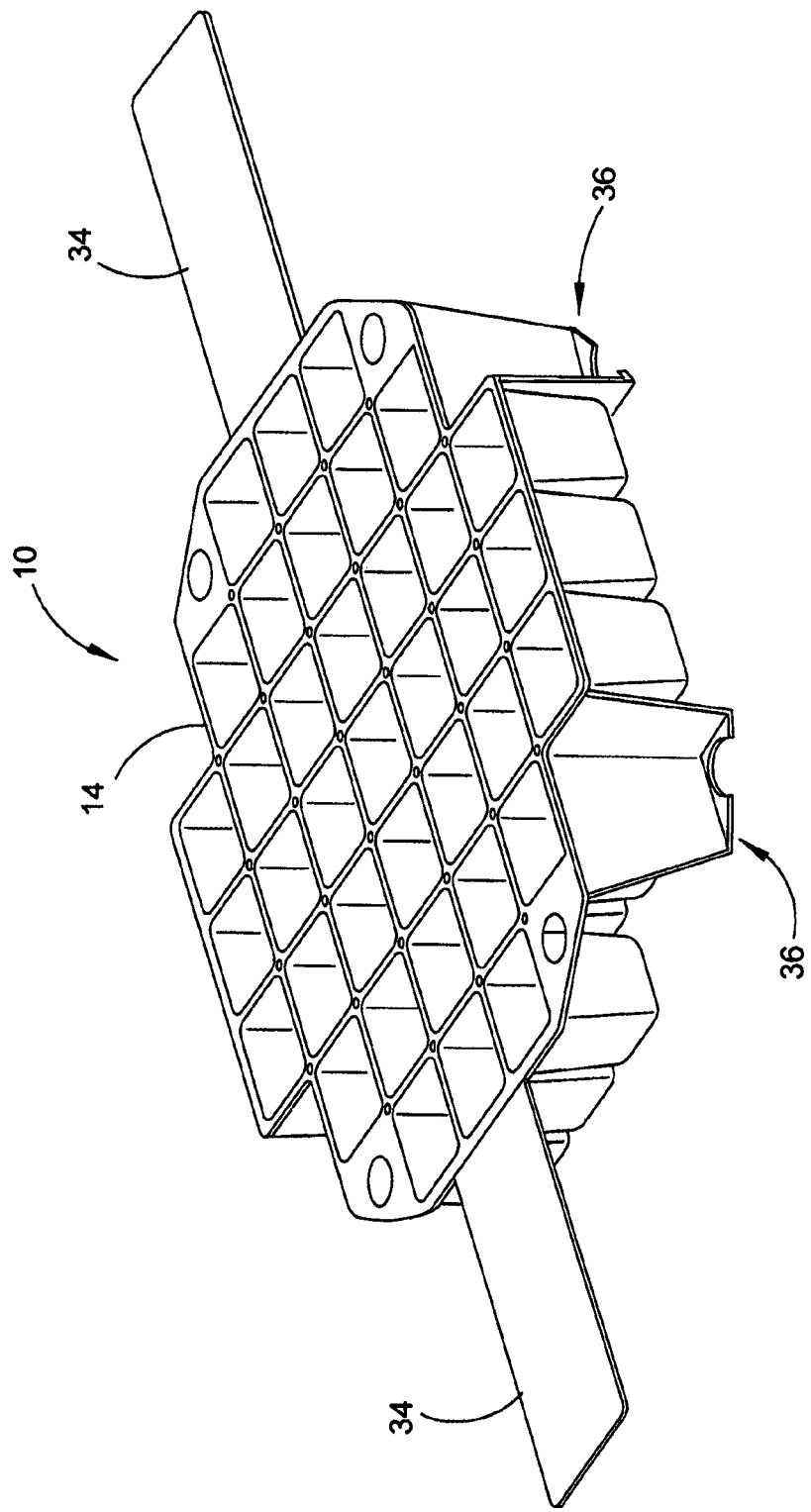
FIG. 9 shows a perspective view of an insert in accordance with another example of the present invention.
Figure 10:
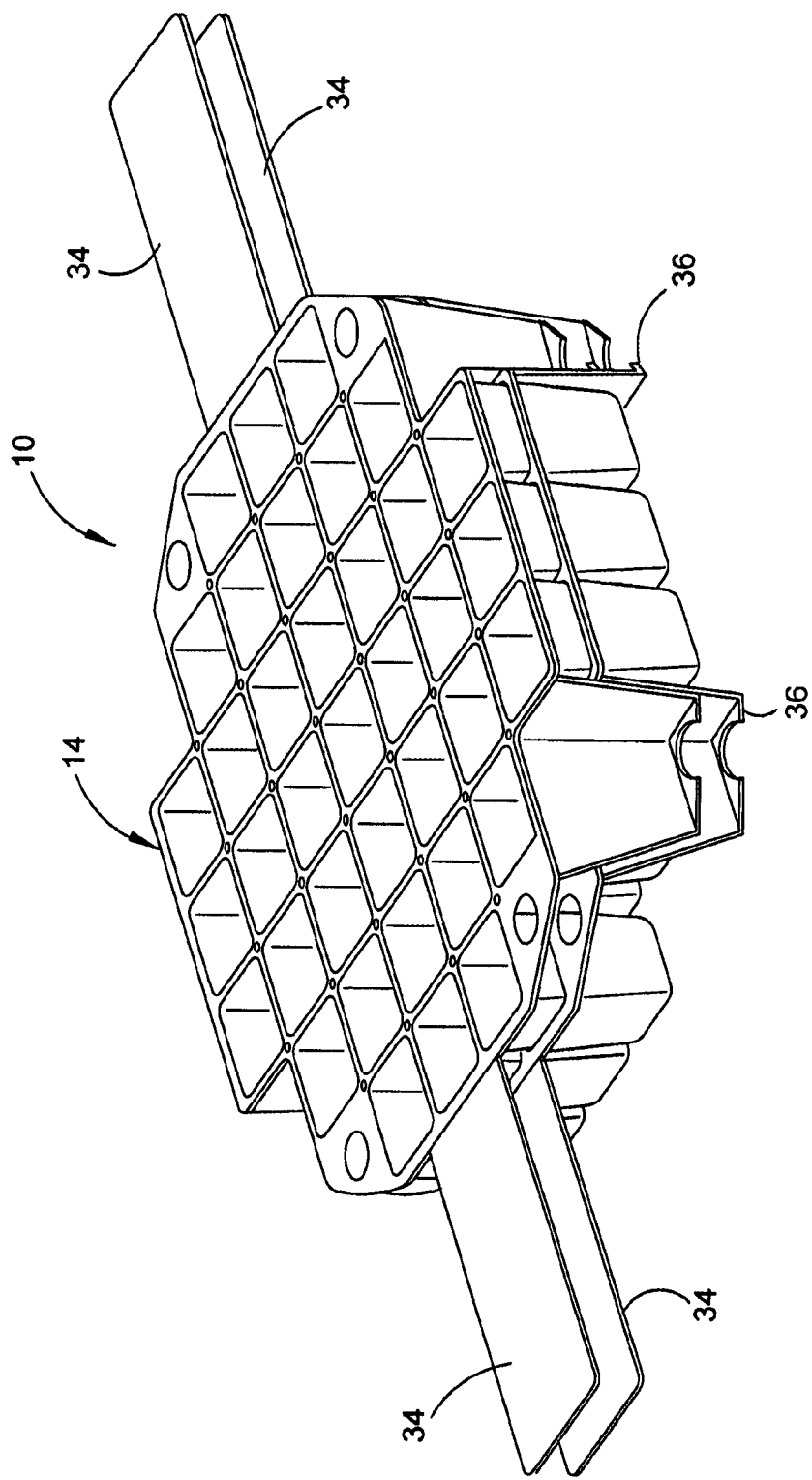
FIG. 10 shows a perspective view of the insert of FIG. 9, shown stacked with another like insert.
Figure 12:
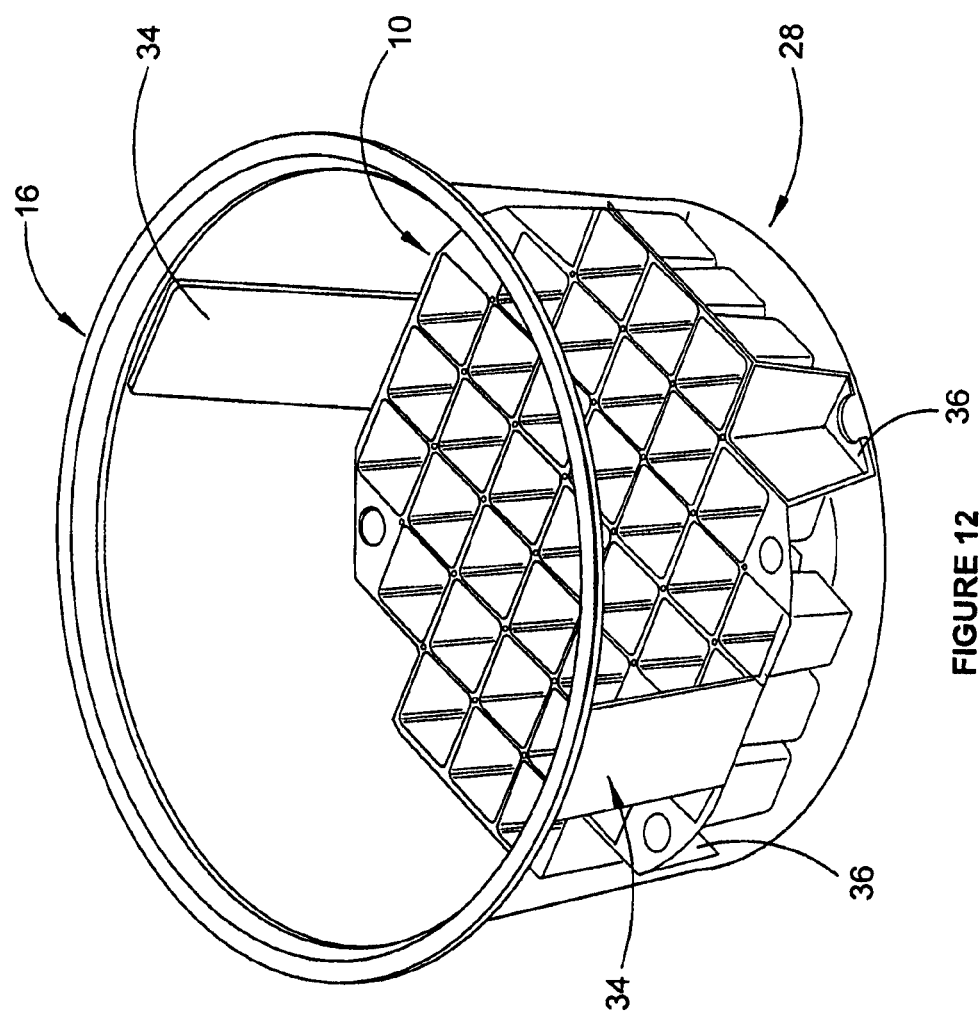
FIG. 12 shows a perspective view of the insert of FIG. 9 shown in a container.

As shown in FIG. 9, the insert 10 may have a pair of opposed arms 34 located on opposite sides of the insert 10 so as to hold the insert 10 securely in position. The insert 10 may also have feet 36 which extend below the receptacles 14 of the insert 10 so as to support the receptacles 14 above the floor 28, as shown in FIGS. 12 and 13. As shown in FIG. 12, the feet 36 may be configured also to sit against a sidewall of the container 16 to hold the insert 10 laterally relative to the container 16.

Figure 11:
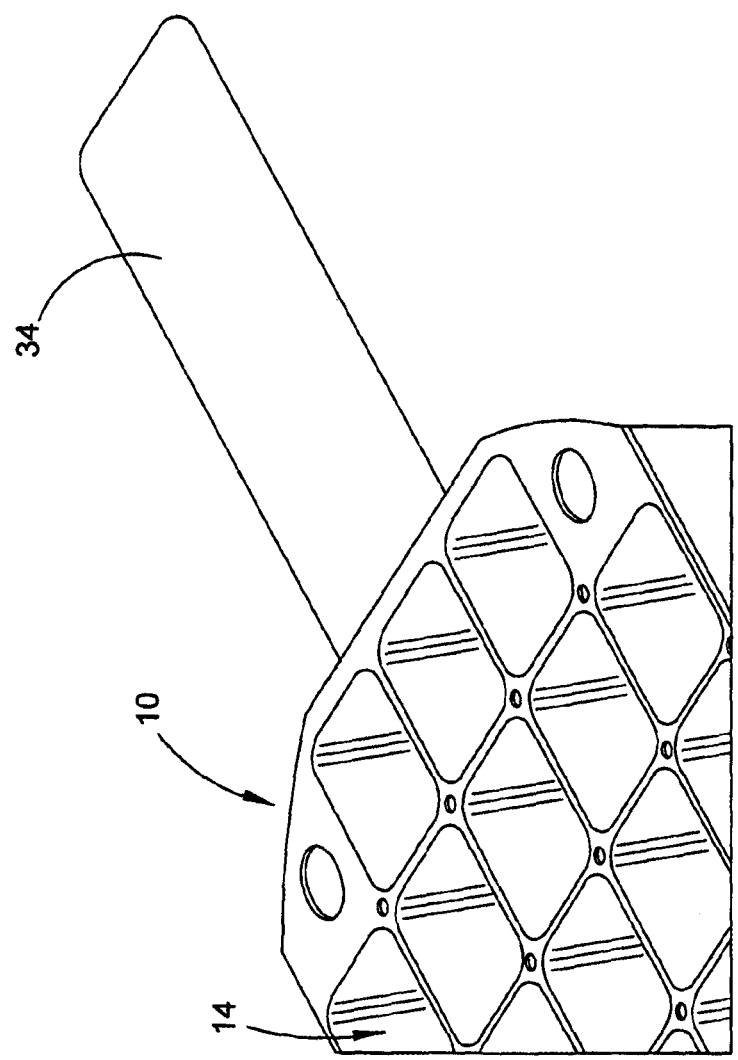
FIG. 11 shows a detailed view of an arm of the insert of FIG. 9.

In the example shown, each arm 34 is foldable between an initial condition (see FIGS. 9 to 11) wherein the arm 34 extends parallel to a plane of the insert 10 to a folded condition (see FIGS. 12 and 13) which is substantially perpendicular to the initial condition. The insert 10 may be formed with the arms 34 in the initial condition (parallel to the plane of the insert 10) to facilitate neat volume-efficient stacking of like inserts (see FIG. 10). The receptacles 14 may also be tapered to facilitate stacking of the inserts 10, and the feet 36 may also be angled outwardly for this reason. FIG. 11 shows detail of one of the arms 34 which may be scored where the arm 34 meets the remainder of the insert 10 such that the arm 34 can be bent upwardly along the score line to the folded upright condition.

By virtue of the arms 34, even if the closed container 16 is inverted the insert 10 will remain in its proper position relative to the container 16 by virtue of the tips of the arms 34 abutting against the lid of the container 16, thereby holding the insert 10 to sit against the floor 28 of the container 16.

The insert 10 may be transparent. Alternatively, the insert 10 may be opaque. The insert 10 may be provided with locating points in the form of the feet 36 having locating holes. In this way, the insert 10 may be used as a carrier tray and the locating holes can be used as reference points for a machine to locate/remove the plants. The use of the locating holes as reference points for this purpose may be performed by a computer software program which controls operation of the machine for locating/removing the plants. The locating holes on the insert 10 may be used for lifting the insert 10 from the container 16, as reference points for a robotic machine automatically locating the plants to remove the plants from the insert 10, and for holding the insert 10 for discarding same.

Advantageously, the container 16 fitted with the insert 10 allows plants to be efficiently transported between countries. More specifically, plants may be supplied by way of a method including the steps of: (a) growing the plants in a first country in a sterile environment, the plants being planted in agar for feeding the plants; (b) storing the plants in the sterile environment in a sealed container, the plants being arranged in a predetermined ordered arrangement in the container; (c) transporting the container to a second country in the sealed container; (d) opening the container in the second country; and (e) removing the plants from the container using a machine which automatically locates and removes each of the plants on the basis of the predetermined ordered arrangement.

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The claims defining the invention are as follows:

1. A method of supplying plants including the steps of:
   growing the plants in a first country in a sterile environment, the plants being planted in agar for feeding the plants;
   storing the plants in the sterile environment in a sealed container, the plants being arranged in a predetermined ordered arrangement in the container;
   transporting the container to a second country in the sealed container;
   opening the container in the second country; and
   removing the plants from the container using a transplant machine which automatically locates and removes each of the plants on the basis of the predetermined ordered arrangement.

2. A method of supplying plants as claimed in claim 1, wherein the method includes the steps of providing the predetermined ordered arrangement of the plants to the transplant machine, and using the transplant machine to automatically transplant the plants externally of the container according to the predetermined ordered arrangement.

3. A method of supplying plants as claimed in claim 1, wherein said step of transporting the container to a second country in the sealed container includes the step of transporting the container through a border control of the second country which forbids entry of soil into said second country.

4. A method of supplying plants as claimed in claim 1, wherein said container is fitted with an insert and the insert defines said predetermined ordered arrangement.

5. A method of supplying plants as claimed in claim 1, wherein said method includes the step of using computer software controlling said transplant machine to locate each of the plants automatically using one or more reference points provided on the insert.

* * * * *